Dec. 30, 1958   P. E. BORDEN   2,866,883
BARBECUE UNIT
Filed July 5, 1955

INVENTOR
PHILIP E. BORDEN
BY Elliott & Pastoriza
ATTORNEYS

United States Patent Office 2,866,883
Patented Dec. 30, 1958

2,866,883

BARBECUE UNIT

Philip E. Borden, Ojai, Calif.

Application July 5, 1955, Serial No. 519,761

2 Claims. (Cl. 219—35)

This invention relates to barbecue units, and more particularly to a portable, charcoal barbecue apparatus primarily designed for indoor use.

There are many different types of outdoor barbecuing equipments. Most of these units, however, are too bulky and hazardous for indoor use. Of the few barbecue equipments available for indoor use, there has been a trend to modify the conventional barbecue construction so as to eliminate undesirable smoke and sparks which cannot normally be tolerated in indoor usage. Unfortunately, however, such indoor units in achieving this objective usually sacrifice the tastiness of the smoked flavor, which has brought barbecue broiling into such high regard.

Another important consideration in using barbecue units indoors is the difficulty in igniting the charcoal. Even with outdoor apparatus this is a troublesome procedure and usually necessitates allowing considerable time in order to bring about the proper burning. Inflammable fluids now available for this purpose quicken this step, but they have the disadvantage of being relatively expensive and in addition they only serve to initially ignite the charcoal without providing continued heat. Thus, the charcoal thereafter burns slowly until a sufficient time has elapsed so that a bed of red hot coals has been created suitable for proper broiling. As a part of this time consuming delay period is the further increased cost factor incurred as a result of a significant proportion of the charcoal being burned before red heat is attained.

It is therefore an object of the present invention to provide a charcoal barbecue unit designed primarily for indoor usage which is so constructed as to retain all the advantages of the conventional outdoor barbecue equipment.

Another object is to provide a charcoal barbecue unit which is so constructed that no exterior means of igniting the charcoal are required.

A further object is to provide a charcoal barbecue unit embodying features such that the charcoal can be quickly ignited to the proper condition for cooking purposes.

A still further object is to provide a charcoal barbecue unit including the above objects which may be economically manufactured relative to competitive units available, and which is susceptible of appreciably lower operating cost than present day units.

These and other objects and advantages of the barbecue unit of the present invention are achieved in part by providing an electrical heating means within the casing structure. A grill is mounted in the upper portion of the casing, as in the conventional outdoor barbecue construction. In the bottom portion of the casing is mounted a removable ash and drip pan, for removing ashes created by burned charcoal as well as drippings from the food product being cooked. In an intermediate portion of the casing is mounted a grate, which acts partially as a support for the charcoal. The electrical heating means is in a preferred embodiment disposed immediately above the grate and may be supported thereon.

A better understanding of the improved charcoal barbecue unit according to the present invention may be had by reference to the accompanying drawings, wherein a preferred embodiment is shown for illustrative purposes, and in which.

Figure 1:
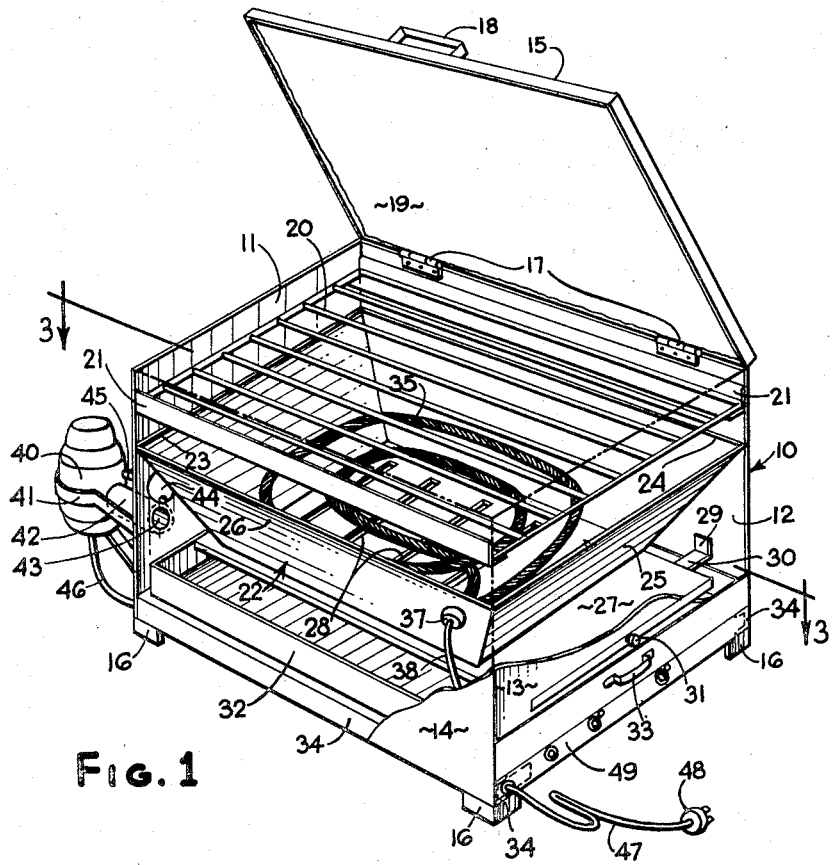
Figure 1 is a perspective view, with some portions removed to show the interior, of the barbecue unit of the present invention.

There is shown in Figure 1 the improved barbecue unit with a generally designated casing 10 having sidewalls 11, 12, 13, and 14, and provided with a top panel 15. The casing 10 may be suitably supported by legs 16.

The top panel 15 may be connected to the sidewall 12 by hinges 17 and provided with handle 18 so that the panel 15 may be rotated back down against the sidewall 12 when the barbecue unit is being used for cooking. The panel 15 is also desirably provided with a heat resistant insulating material, such as an asbestos matting 19, thereby preventing any appreciable heating of its outer surface or of the handle 18.

Within an upper portion of the casing 10, there is provided a grill 20 suitably supported on a pair of flanged rails 21 attached to sidewalls 12 and 14, respectively. The grill 20 may be of any conventional construction for slidable mounting on the rails 21.

Disposed within the casing 10 below the grill 20 is a charcoal retaining structure 22, comprising downwardly converging plates 23, 24, 25, and 26. The plates are welded or otherwise permanently secured at their upper edges to the respective sidewalls 11, 12, 13, and 14. The bottom edges of the plates 23, 24, 25, and 26 collectively form a rectangular opening through which air may pass vertically in the casing in a manner to be hereafter described.

Positioned immediately below structure 22 is a grate 27 provided with a plurality of slots 28. The grate may be supported by any conventional bracketing means formed integrally with or suspended from the structure 22 or attached to the casing sidewalls. In the illustrative embodiment of Figure 1, right angle brackets 29 are provided on sidewalls 12 and 14 with lateral leg portions 30 extending inwardly to act as a slidable mounting for the grate 27. The grate 27 is provided with a handle 31, adapted to extend through the sidewall 13 so that the grate may be shifted back and forth on the leg portions 30.

In a lower portion of the casing 10, there is shown a box-like ash pan 32 having a handle 33. The ash pan 32 is slidably mounted on U-shaped channel members 34 which extend throughout the length of the casing 10.

A primary feature of the present invention resides in the provision of means for igniting the charcoal. For this purpose, there is positioned on the grate 27 and partially on the structure 22 an electrical heating unit 35, preferably formed from two integral coils of conventional "Calrod" structures. The heating unit 35 terminates in two terminals 36, which may be electrically connected through an aperture 37 in the plate 26 to a lead 38. Thereafter the lead 38 may be plugged into a terminal box 39 connected into the electrical circuit of the barbecue unit.

A blower 40 may be provided exterior of the casing 10 and supported, for example, by a bracket 41 connected to the sidewall 11. The blower 40 communicates through a ducting 42 to an opening 43 of the sidewall 11. A damping means in the form of an eccentrically pivoted member 44 is provided adjacent the opening 43 and has an associated handle 45 extending through the sidewall 11; and thus the ducting 42 may be damped to decrease the area of the air passage into the casing 10. For purposes of this description, the blower 40 has been shown mounted near a corner of the casing 10, although in actual construction it might be desirably positioned more centrally in relation to the width of the sidewall 11.

Power for the blower 40 is provided by a lead 46, which passes from the blower 40 through the sidewall 11 into the U-shaped channel 34 to thereafter be suitably connected into the electrical circuit of the barbecue unit at the terminal box 39. An inlet lead 47 with a conventional plug 48 may be used for bringing power into the terminal box 39 and in turn to the blower motor 40 and heating unit 35.

Figure 2:
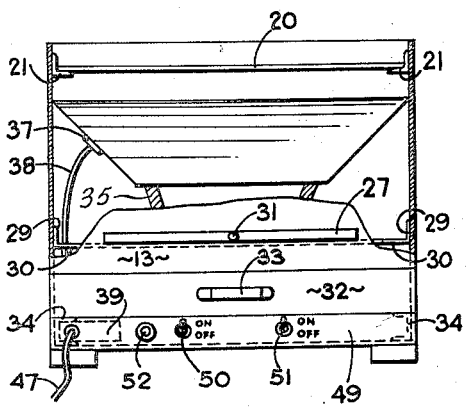
Figure 2 is an end view, with some portions removed to show the interior of the barbecue unit shown in Figure 1 with the top panel 15 not being shown.

A switch panel 49 is disposed immediately below the end of the ash pan provided with handle 33. As shown more clearly in the view of Figure 2, an "on-off" conventional switch 50 and a similar switch 51 are provided on the panel 49. The switches are suitably wired into the terminal box 39 to control the operation of the blower motor 40 and the heating unit 35. As a precautionary measure, a pilot light 52 may be disposed on the panel 49 to indicate to the user whether or not the blower motor or heating unit is connected into the line.

In operation, charcoal or any other conventional wood product is first deposited in the retaining structure 22 so as to be funneled down onto the grate 27 and held in by the lower portions of the plates 23, 24, 25, and 26. Thereafter the plug 48 is connected into an electrical source of power and the switch 51, for example, may be turned on to connect the heating unit 35 into the line. The blower motor 40 may be similarly placed in operation by turning on the other switch 50, which results in an air flow through the duct 42 into the opening 43 in the casing 10, and thereafter up through the slots 28 to pass out through the grill 20 and upper portion of the casing, assuming of course that the top 15 has been rotated back. The heating unit 35, in cooperation with the draft created by the blower 40, will rapidly ignite the charcoal into a condition suitable for broiling the food product to be subsequently positioned on the grill 20. In actual practice, red coals are formed in a matter of three or four minutes. The switch 51 may then be turned to the "off" position to disconnect the heating unit 35 and the barbecue unit is ready for cooking.

If desirable, the handle 45 may be rotated to actuate the damper 44 to the most advantageous position for proper air flow. In some instances, it has been found satisfactory to disconnect the blower 40 by turning off the switch 50, and instead use the slidably mounted ash pan 32 as a means of creating a proper draft. The ash pan 32 may be used to creat a draft by merely sliding the pan 32 out of the casing 10 a given distance. Since the pan 32 forms the bottom of the casing 10, air will then pass directly through the resulting bottom opening and then up through the inner portion of the casing 10 in the same manner as with the air flow formerly created by the blower 40.

After the food is cooked to the right degree, it is removed from the grill 20, and the charcoal coals can be quickly extinguished by turning off the blower 40 or by pushing in the ash pan 32 and then closing down the top 15. Thus, the fire is snuffed out by being closed off from further air supply. The asbestos matting 19 acts to prevent the top 15 and handle 18 from heating up during this operation.

The grate 27 is slidably mounted in order that it may be shifted back and forth on the legs 30 so that ashes may pass down through the slots 28 into the ash pan 32.

Figure 3:
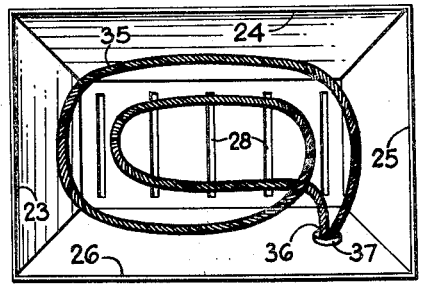
Figure 3 is a top elevational view of only the charcoal supporting means, electrical heating means, and grate taken in the direction of the arrows 3—3 of Figure 1.

It should be further noted that the slots 28, as clearly shown in Figure 3, are designed to give a well distributed air flow up through the grate 27. For this purpose, the slots may in other embodiments be of different configurations depending on the overall design of the barbecue unit. On the other hand, the slots 28 must be dimensioned such that the air flow is not of an amount resulting in an unnecessary rate of consumption of the charcoal. It has been found in certain instances that small apertures in the plates 23, 24, 25, and 26 may also be helpful in this regard.

An important advantage of this improved barbecue unit is its adaptability to modern kitchen designs. By merely replacing the top 15, with suitable side wall extensions connecting to a chimney, the unit may be used indoors without the discomfort occasioned by smoke penetrating the house. In such usage, one of the extended walls would have a front opening to provide access to the food. It will also be appreciated that the barbecue unit may be modified to meet particular spatial limitations, for example by relocation of the blower 40 or removal of the legs 16.

Structural and electrical details have not been shown or described since conventional construction is adaptable and is well known in the art. In addition, it will be evident that certain changes and modifications may be made in the embodiment chosen for illustrative purposes without departing from the spirit and scope of the invention. For example, rather than hinging the top 15, it may simply be fitted within the confines of the side walls to rest on top of the grill.

From the foregoing description in conjunction with drawings, it will be seen that the improved barbecue unit of the present invention enables quick ignition and burning of the charcoal to the proper condition for cooking and has further provision for rapidly extinguishing the hot coals, thereby affording an extremely economical unit requiring only a small amount of charcoal and electrical power. In addition, the unit may be employed in the home by connection to a suitable exhaust vent without the danger of sparks or the discomfort of smoke, and has the further advantage of portability because of its relatively simple and light construction.

What is claimed is:

1. A barbecue unit comprising: a casing having four vertical side walls; a grill mounted in an upper portion of said casing; a grate slidably mounted in said casing below said grill, said grate being adapted to support charcoal and having a plurality of apertures for the passage of air and ashes therethrough; charcoal retaining means disposed in said casing and spaced between said grill and said grate, said retaining means comprising four heat conducting plates having their upper edges secured, respectively, to said side walls, said plates extending downwardly and inwardly to collectively form at their lower edges a rectangular opening immediately above said grate, whereby charcoal may be funneled downwardly through said retaining means onto said grate; and electrical heating means extending laterally across said retaining means and vertically through said rectangular opening, said electrical heating means being partially supported on said grate and partially supported on and engaging said retaining means for igniting and heating said charcoal, whereby said electrical heating means acts to effectively conduct heat throughout the entire volume of said retaining means in its position above said grate.

2. A barbecue unit according to claim 1, and a slidably mounted ash pan forming a bottom closure for said casing, whereby said ash pan may be adjustably positioned to permit a desired draft through the bottom of said casing.

References Cited in the file of this patent

UNITED STATES PATENTS 2,161,669  Freeman _____ June 6, 1939

(Other references on following page)

UNITED STATES PATENTS

| | | | |
|---|---|---|---|
| 2,210,720 | Johnson et al. | Aug. 6, 1940 |
| 2,234,004 | Lamm | Mar. 4, 1941 |
| 2,240,367 | Fernholtz | Apr. 29, 1941 |
| 2,292,377 | Howard | Aug. 11, 1942 |
| 2,463,712 | Newell | Mar. 8, 1949 |
| 2,469,885 | Molla | May 10, 1949 |
| 2,510,856 | Bettencourt | June 6, 1950 |
| 2,530,166 | Johannsen | Nov. 14, 1950 |
| 2,556,365 | McKnight | June 12, 1951 |
| 2,565,000 | Schultz | Aug. 21, 1951 |
| 2,626,559 | Rau | Jan. 27, 1953 |
| 2,691,368 | Hood | Oct. 12, 1954 |